March 21, 1944.  W. VAN SICKLE  2,344,838
FISHING BAIT RETRIEVER
Filed Dec. 29, 1941
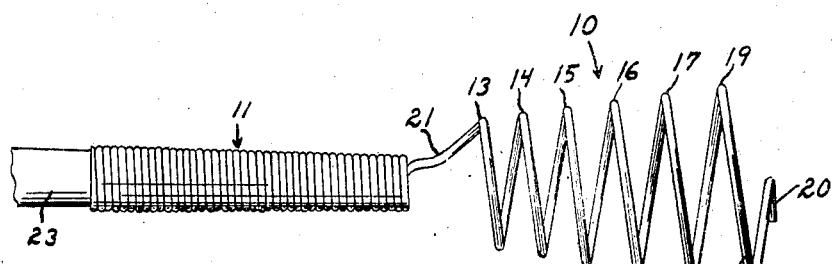
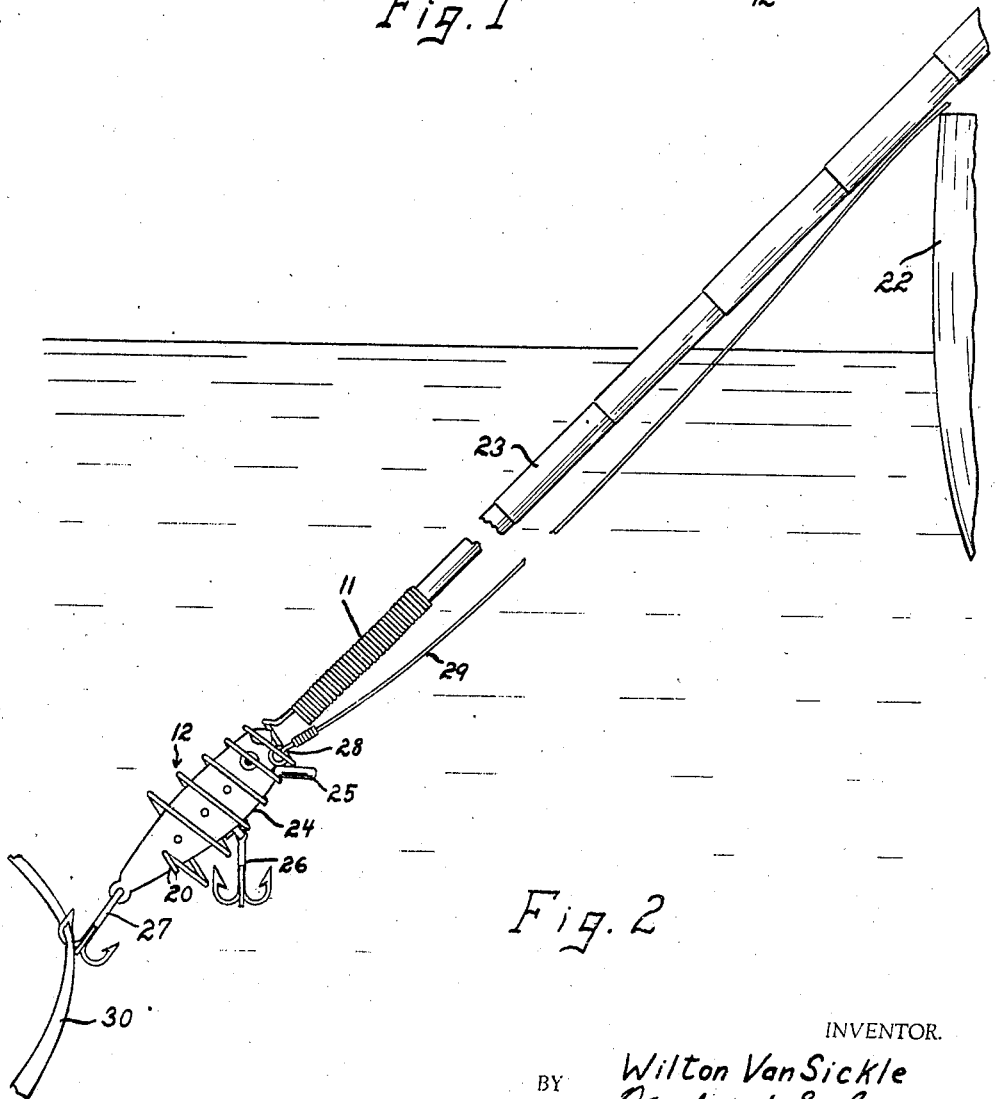
INVENTOR.
Wilton Van Sickle
BY Frederick E. Lange
ATTORNEY.

Patented Mar. 21, 1944

2,344,838

UNITED STATES PATENT OFFICE 2,344,838

FISHING BAIT RETRIEVER

Wilton Van Sickle, Lincoln, Nebr.

Application December 29, 1941, Serial No. 424,777

5 Claims. (Cl. 43—30)

The present invention is concerned with a fishing bait retriever and more particularly with a device for retrieving artificial bait or plugs which have been snagged beneath the water.

Various arrangements have been devised for retrieving artificial bait, the hooks of which have become entangled with underwater obstructions. Many of these have been quite complicated and where they have not, they have usually relied upon the somewhat uncertain method of jarring the hooks loose from the obstructions by a series of impacts.

An object of the present invention is to provide a bait retriever of extremely simple construction in which the bait to be recovered is positively engaged.

A further object of the present invention is to provide a fishing bait retriever in which provision is made for gripping the artificial bait so that it may be directly manipulated.

Briefly, these objects are accomplished by providing a spirally wound member having sufficient spacing between the ears to permit the passage first of the line and later of various projecting portions of the bait. This spirally wound coil is secured to the end of a rigid member such as a rod.

Further objects and details of the invention will be apparent from a consideration of the accompanying specification claims, and drawing, of which:

Figure 1 is an elevational view of my improved retrieving device; and

Figure 2 is an elevational view of the retrieving device being employed to remove an artificial bait from an underwater obstruction.

Referring to Figure 1 of the drawing, it is to be noted that the retriever comprises two portions 10 and 11. The portion 10 consists of a wire 12 which is spirally wound to provide a plurality of turns 13, 14, 15, 16, 17, and 19 of increasing diameter. The final turn 19 terminates in a portion 20 reversely bent to form a hook. The purpose of this hook will be explained later.

One of the important features of the invention is that the turns are spaced a substantial distance apart from each other. This spacing should be sufficiently great to provide for the entrance of a hook shank or a spoon between the turns. Because of the turns being spaced in this manner, it is possible to wind the spiral 10 completely onto the artificial bait.

Another important feature of the spiral is the fact that the innermost turn 13 is still of substantial diameter. The diameter of this inner turn is preferably sufficiently great to accommodate the mouth portion of the artificial bait.

The portion 11 consists of a large number of relatively closely spaced turns and is employed for attaching the retriever to the end of a pole such as a bamboo pole. Because of the large number of closely spaced turns wound in spiral form, the attaching portion 11 can be screwed firmly onto a pole of the type of a bamboo pole. The portions 10 and 11 are connected by the portion 21. Preferably, all three portions are formed of the same continuous strand of wire 12. In certain cases, instead of the portion 11, other means can be employed for securing the retriever to a member by which it can be manipulated. Thus, the end of the portion 21 can be secured directly to the end of the rod by being forced inwardly and secured in position by a cap or other similar member.

My improved retriever is shown in Figure 2 attached to a rod 23 and being used to retrieve an artificial bait 24, commonly referred to as a "plug." The pole 23 is shown as a conventional bamboo pole. As previously indicated, it is possible to thread the end of the pole into the portion 11 and have the portion 11 securely held to the pole. This is particularly true of a bamboo pole which tends to be tapered and somewhat yieldable. The pole 23 is shown as extending up near a boat 22. As indicated in the drawing, the pole 23 is shown as broken away. Actually, the length of the pole is considerably greater than that shown in Figure 2. This bait has the usual spoon 25 and hooks 26 and 27 which are pivotally connected to the body of the bait. These hooks 26 and 27 are shown as being of the triple barb construction but obviously can be of any conventional form. An eye 28 is secured in the mouth portion of the plug 24 and a line 29 is secured to this eye. The line is shown as extending up to the boat 22.

As shown, one of the barbs of hook 27 is caught on a branch 30. If line 29 were pulled sufficiently hard, the probable result would be that the line would break and the plug 24 would remain at the bottom of the water. With my improved device, the fisherman holds the line 29 relatively taut with one hand and threads the spiral 12 over the line until the line extends centrally through the spiral. The spiral is then moved downwardly over the line until the plug is engaged. The spiral is again rotated with the result that the spiral is wound around the plug as shown in Figuer 2. It will be evident that the bait 24 is now securely held within the spiral and that it is impossible to remove the spiral from the bait. Regardless of whether the bait has a spoon and a hook in the position of spoon 25 and hook 26 or whether some other arrangement is provided, almost all such baits will have some projecting portion which can be introduced between the turns of the spiral.

The fisherman is now in a position to manipulate the plug 24 readily so as to disengage the hook 27 from the branch 30. It will be seen that the spiral 12 and the pole 23 permit the plug 24 to be manipulated almost as directly as though the plug were actually held in the hand. It is thus possible to easily disengage the hook from the branch. If it is necessary to pull on the plug, this can be done with no danger of the spiral coming loose from the plug.

The reversely disposed hook 20 on the end of the spiral 12 is of utility in those rare cases in which the spiral 12 does not grip the plug 24 with sufficient force. This is sometimes due to the fact that plug 24 may be of such diameter that the obstructing portions tend to pass freely through the spiral. In any event, when the spiral 12 fails to grip the plug, all that it is necessary to do is to rotate the spiral in the reverse direction until the hook engages one of the hooks of the plug. This will result in the spiral 12 becoming firmly anchored to the plug so as to permit the manipulation of the plug.

It will be seen that I have provided an extremely simple arrangement for retrieving an artificial bait. It is to be further noted that this arrangement provides for firmly gripping the artificial bait and readily manipulating it. It is thus possible to remove an artificial bait from almost any type of obstruction without injury to the bait.

In general, while I have shown a specific embodiment of my invention, it is to be understood that this is for purposes of illustration and that my invention is to be limited only by the scope of the appended claims.

What I claim is:

1. In a device for retrieving fish plugs of the type having projecting members, such as hooks, secured thereto, a helically wound member having its turns spaced a sufficient distance apart to permit the passage therebetween of the projecting members, the outer extremity of said member being turned backwardly to provide a book portion, and means for securing said helically wound member to an operating member therefor.

2. In a device for retrieving artificial bait of the type having projecting members, such as hooks, secured thereto, a spirally wound member having its turns spaced a sufficient distance apart to permit the passage therebetween of the projecting members, the outer extremity of said member being turned backwardly to provide a hook portion, and a sleeve portion for securing said spirally wound member to a handle member, said sleeve portion comprising a plurality of closely spaced turns of said member, the outermost of said closely spaced turns being spaced from the innermost one of said first named turns by a distance at least as great as the spacing between said first named turns.

3. A device for retrieving artificial bait comprising a wire wound first in a relatively large diameter spiral with the turns spaced a substantial distance apart and with the smallest turn at its innermost end and of a diameter over half that of the outermost turn, and then in a long, relatively small diameter spiral with closely spaced turns to form a sleeve for attaching the first named spiral to a rod, the outermost turn of said small diameter spiral being spaced from the innermost turn of the large diameter spiral by a distance at least as great as the spacing between the turns of said large diameter spiral.

4. A device for retrieving artificial bait comprising a wire wound first in a relatively large spiral with the turns spaced a substantial distance apart and then in a long, relatively small diameter spiral with closely spaced turns to form a sleeve for attaching the first named spiral to a rod, both spirals increasing in diameter from the center outwardly, the outermost turn of said first spiral having a reversely disposed hook portion, and the innermost turn of said first spiral having a diameter over one half that of said outermost turn.

5. In a device for retrieving artificial fish bait of the type having projecting members, such as hooks, secured thereto, a helically wound portion having its turns spaced a sufficient distance apart to permit the passage therebetween of the projecting members, the average diameter of the turns of said helically wound portion being slightly larger than that of a conventional artificial bait, means adapted to surround the end of a handle member, and an elongated portion extending between said last named means and helically wound portion in such a manner as to provide an unenclosed portion of a length equal at least to the spacing of said turns.

WILTON VAN SICKLE.